United States Patent [19]
deFasselle et al.

[11] Patent Number: 4,787,253
[45] Date of Patent: Nov. 29, 1988

[54] ELECTRONIC DISPLAY FLOW METER

[75] Inventors: Craig R. deFasselle, 7361 Briar Hill Rd., Kirtland, Ohio 44094; Robert J. deFasselle, Timberidge Trail, Gates Mills, Ohio 44040; David E. Kent, Palm Harbor, Fla.

[73] Assignees: Craig R. deFasselle, Kirtland; Robert J. deFasselle, Gates Mills, both of Ohio

[21] Appl. No.: 67,927

[22] Filed: Jun. 29, 1987

[51] Int. Cl.$^4$ .................................................. G01F 1/24
[52] U.S. Cl. ........................ 73/861.54; 73/DIG. 5; 364/510
[58] Field of Search ........... 73/861.54, 861.56, 861.58, 73/DIG. 5, 313; 364/510

[56] References Cited

U.S. PATENT DOCUMENTS

| | | | |
|---|---|---|---|
| 2,070,375 | 2/1937 | Sherwood | 73/861.56 |
| 2,592,929 | 4/1952 | Matchett | 73/DIG. 5 |
| 3,253,459 | 5/1966 | Sorenson et al. | 73/861.54 |
| 3,555,904 | 1/1971 | Lenker | 73/313 |
| 3,691,834 | 1/1972 | De Fasselle et al. | |
| 3,889,535 | 6/1975 | Bull et al. | 73/861.54 |
| 4,361,051 | 7/1982 | De Fasselle et al. | 73/861.54 |
| 4,487,077 | 12/1984 | Lake | 73/861.58 |
| 4,489,614 | 10/1984 | De Fasselle et al. | 73/861.54 |
| 4,641,523 | 2/1987 | Andreasson | 73/313 |

*Primary Examiner*—Herbert Goldstein
*Attorney, Agent, or Firm*—Body, Vickers & Daniels

[57] ABSTRACT

A flow meter having electrical signal outputs and a digital display is described. A transducer uses a magnet inside the flow meter to position a ball on a resistor bar and a contact bar and, thus, generate a position signal. The position signal provides an accurate electrical indication of flow to the circuitry driving the display.

29 Claims, 7 Drawing Sheets

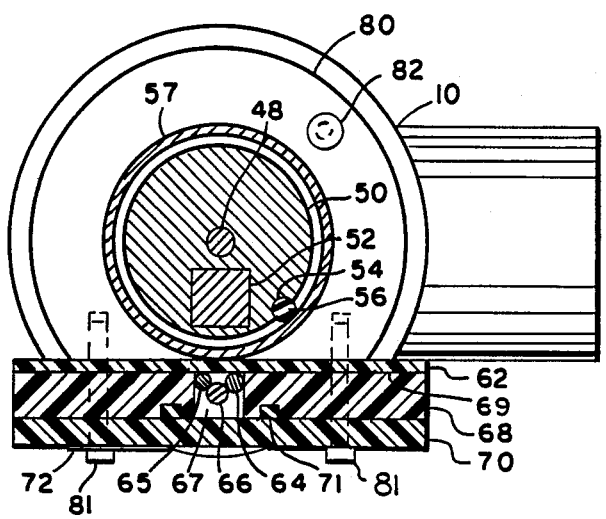
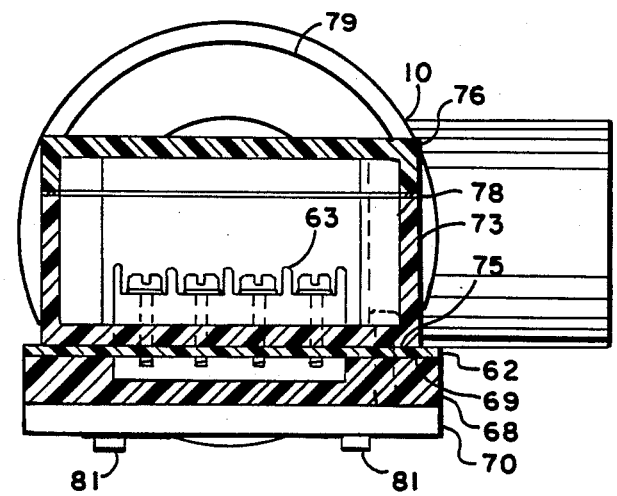

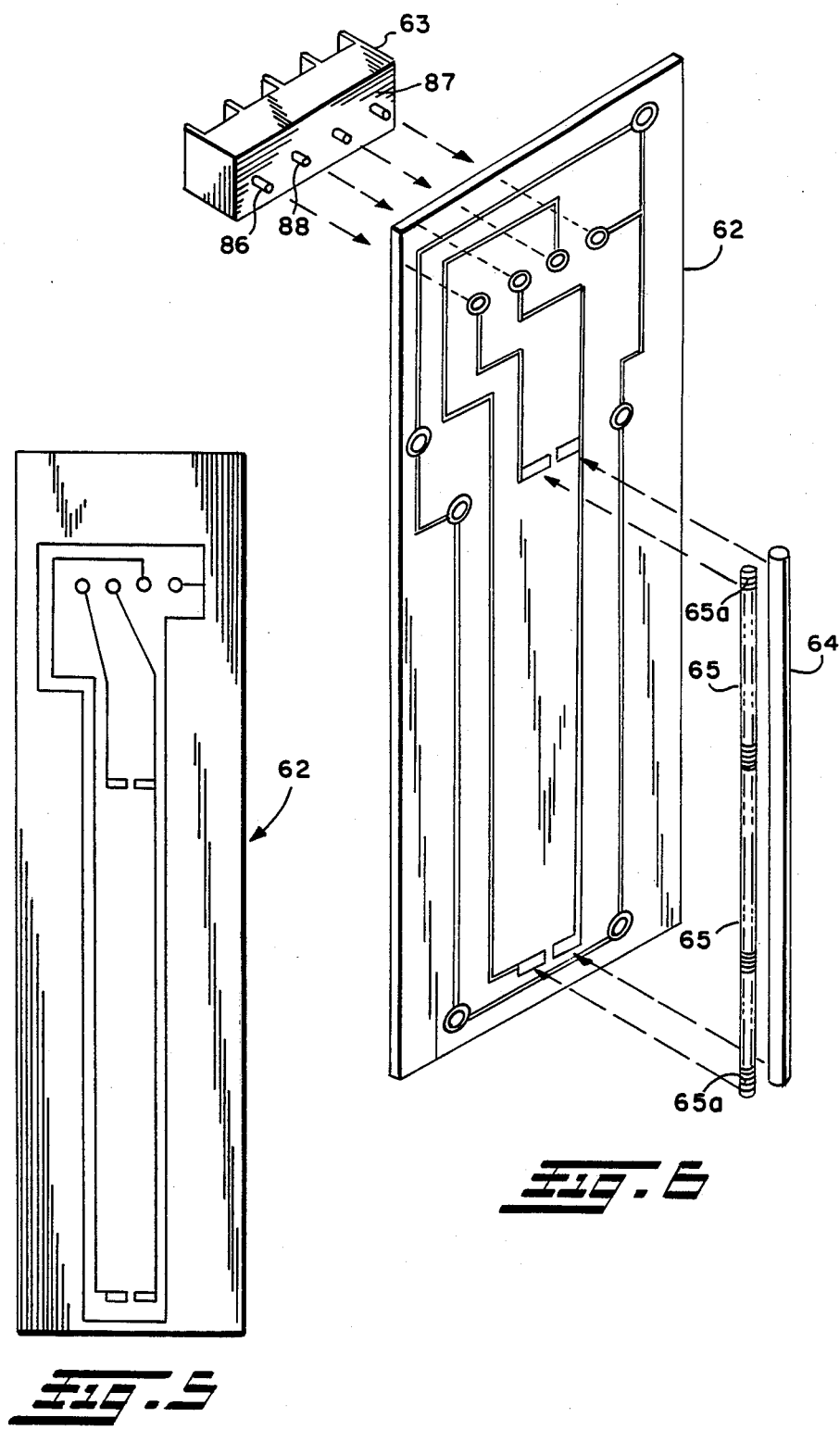

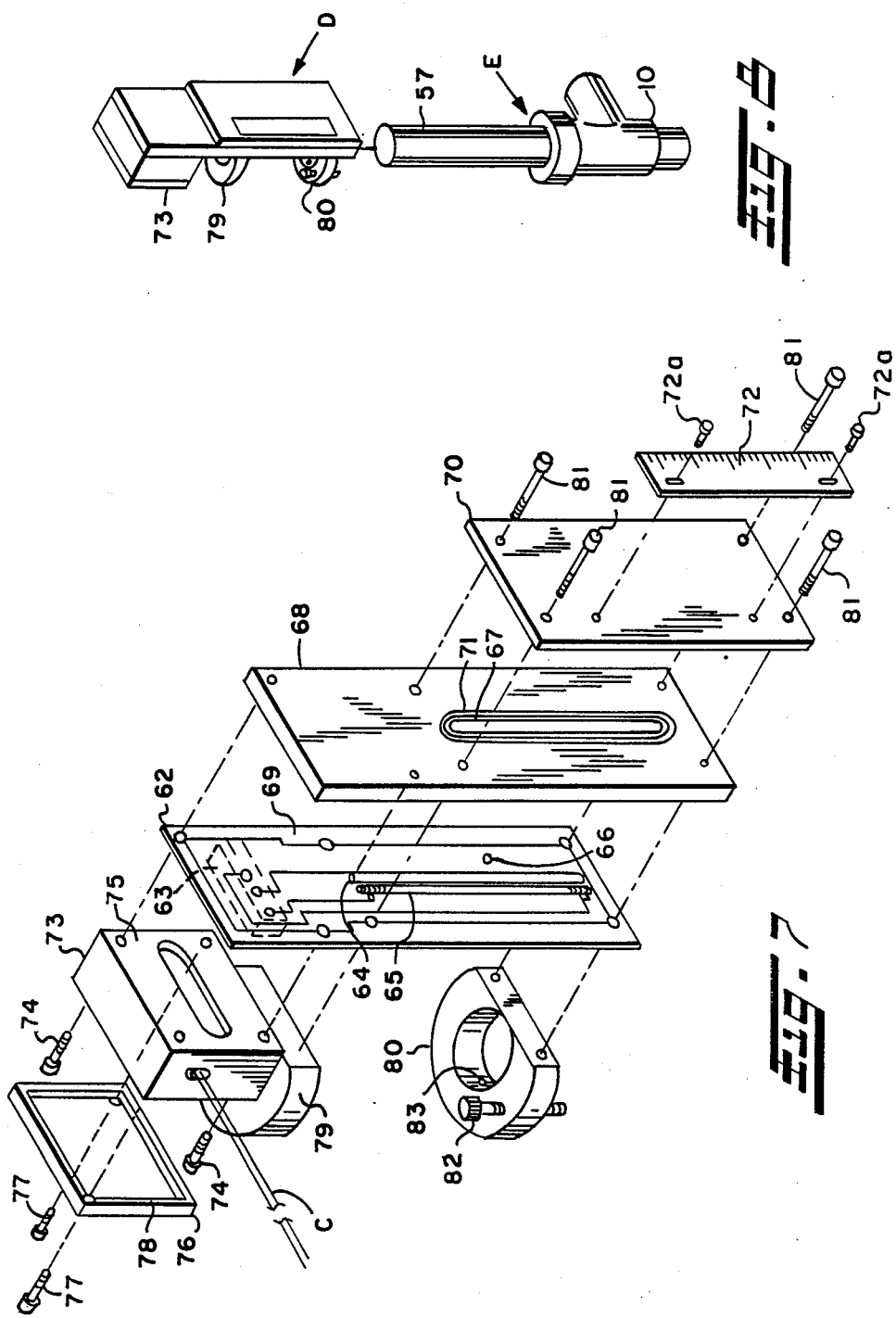

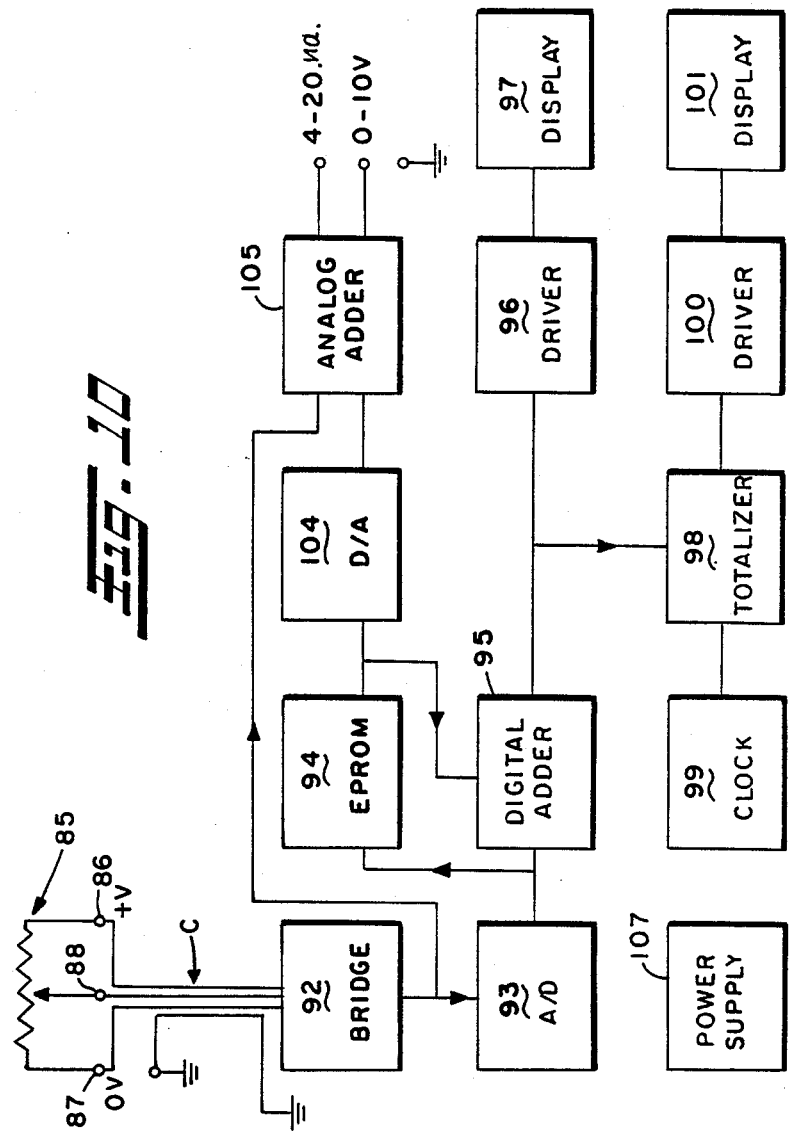

ELECTRONIC DISPLAY FLOW METER

BACKGROUND OF THE INVENTION

This invention relates to flow meters for measuring the rate of flow of a fluid media, either liquid or gaseous. More particularly, the invention relates to a flow meter having an output signal capable of being transmitted to a remote or proximate receiver for display and/or further manipulation.

This invention relates to flow meters in general but will be described with particular reference to variable area flow meters. A first type of variable area flow meter normally comprises a housing having an inlet port and an outlet port, a cylindrical core tube receiving flow into its interior from the input port of the housing and an output slot along the side of the core tube. A movable piston within the core tube responds to the fluid flowing through the core tube by opening the slot sufficiently to allow the flow demanded. An indicator attached to the movable piston is indexed against a scale showing the position of the piston and thereby the flow through the meter. Variable area flow meters are rugged, reliable, accurate and fluidtight. The construction of such flow meters and their theory of operation are described in U.S. Pats. Nos. 3,691,834; 4,361,051; and 4,489,614, all of which are incorporated hereinby reference.

A second type of variable area flow meter, generally known as a rotameter comprises an inlet port, a vertically disposed, upwardly expanding conical chamber and an outlet port. A piston disposed in the conical chamber forms a restriction in the cross-sectional area of the conical chamber. The piston rises or falls within the chamber, thus varying the area of the restriction, in response to changes in flow. An indicator attached to the piston is indexed against a scale and shows flow rate.

Prior art flow meters, including those described in the above-referenced U.S. patents, provide reliable, accurate readings of flow rate at the point at which a meter is disposed. Moreover, such prior art devices could be adapted to provide electrical signals generally indicative of flow rate. However, such electrical flow meters are expensive. Moreover, the means used to produce electrical signals, such as differential transformers, required that the overall flow meter be much larger than a non-electrical flow meter.

The present invention contemplates a flow meter providing electrical output usable by process control equipment and/or capable of operating a remote display which overcomes the above referred to problems and others and provides a compact, accurate flow meter which is simple to install and use and economical to manufacture.

In accordance with the present invention, there is provided a flow meter comprising a housing, a core tube, a piston slidably retained within the core tube which changes its position in accordance with flow through the core tube, a magnet fixed to the piston and a potentiometer comprised of two bars and a contact positioned such that the contact moves along the bars in lock step with the magnet thereby generating a signal indicative of magnet position and flow.

Further in accordance with the invention, the potentiometer provided is comprised of two parallel bars, one bar being a solid metallic bar and the other bar comprising a central core surrounded by a tightly helically wound fine wire.

Still further in accordance with the invention, the contact used in the potentiometer is a metallic ball electrically contacting both bars.

Yet further in accordance with the invention, the poteniometer bars are both circular in cross-section and have a ratio of diameters of 0.075 to 0.125 and the diameter of the ball is 2.08 times the diameter of the smaller bar.

Still further in accordance with the invention, the poteniometer comprised of the ball and two bars is enclosed in a transducer assembly having a transparent outwardly facing surface to which is fixed a scale whereby flow may be visually read at the location of the flow meter in addition to visually read in an electronic display signal or otherwise at the remote location.

Yet further in accordance with the invention, a transducer assembly is provided with mounting rings allowing the transducer to be mounted on the mechanical portions of a flow meter by simply sliding the transducer into place.

Still further in accordance with the invention electronic circuitry is provided processing the signal generated by the poteniometer. The potentiometer signal representative of magnet position is digitized. The digitized position signal is used to access an erasable programmable read only memory (EPROM) location containing a digital correction datum for that particular position. The digitized position figure and the digital correction datum are added to produce a digital flow signal for display. The digital correction figure is also converted to an analog correction signal and added to the potentiometer signal to create a corrected analog flow signal. An analog variable voltage, an analog variable current signal and a digital signal, all directly indicative of flow are thereby created. Additionally, digital integration of flow rates over time to provide total flow and/or other signal processing is also performed allowing display of such signals or the creation and delivery of such signals to a digital computer or other process control equipment for control of an overall process.

It is the primary object of the present invention to provide a reliable, accurate, economical and rugged flow meter having an output which is usable by process control equipment and easily carried to a remote location for further signal processing and/or display.

It is another object of the present invention to provide a flow meter having an output signal available at a remote location and also a local reading of flow at the location of the meter.

It is another object of the invention to provide a flow meter having electrical output signals usable by process control equipment and no electrical parts exposed to fluid being measured.

It is yet another object of the present invention to provide a flow meter having an electrical output and/or other easily transmittible output available at a remote location and a mechanically driven output signal, such as a ball and scale, available at the position of the flow meter even during periods of electrical failure or electronic malfunction.

It is yet another object of the present invention to provide a flow meter having electronic signal processing capabilities such that the flow meter may contribute data and/or signal processing capabilities to larger process control equipment.

It is another object of the invention to provide a transducer assembly which can be slipped over a mechanically complete flow meter and be immediately operable without the need to open the mechanical portions of the flow meter for adjustment or interconnection.

It is a further object of the invention to provide a flow meter having an electrical output, no dynamic seals and complete isolation between the fluid being measured and the meter's electrical parts.

It is still another object of the present invention to provide an electronic flow meter which is very precise and provides repeatable signals.

The invention may take physical form in certain parts and arrangements of parts, a preferred embodiment of which will be described in detail in the specification and illustrated in the accompanying drawings which form a part hereof.

BRIEF DESCRIPTION OF THE DRAWINGS

FIG. 3 is a cross-sectional view taken along line 3—3 of FIG. 1;

FIG. 4 is a cross-sectional view taken along line 4—4 of FIG. 1;

FIG. 5 is a plan view of the transducer printed circuit board used to support the poteniometer in the preferred embodiment;

FIG. 6 is an exploded view showing how the two bars of the potentiometer are assembled to the printed circuit board;

FIG. 7 is an exploded view of the transducer assembly including the potentiometer, used in the preferred embodiment;

FIG. 8 is a partially exploded view showing how the preferred transducer assembly is connected to a mechanical flow meter;

FIG. 10 is an electrical schematic showing the electrical characteristics of the transducer, the signal processing equipment and the display unit.

DETAILED DESCRIPTION OF THE INVENTION

Figure 1:
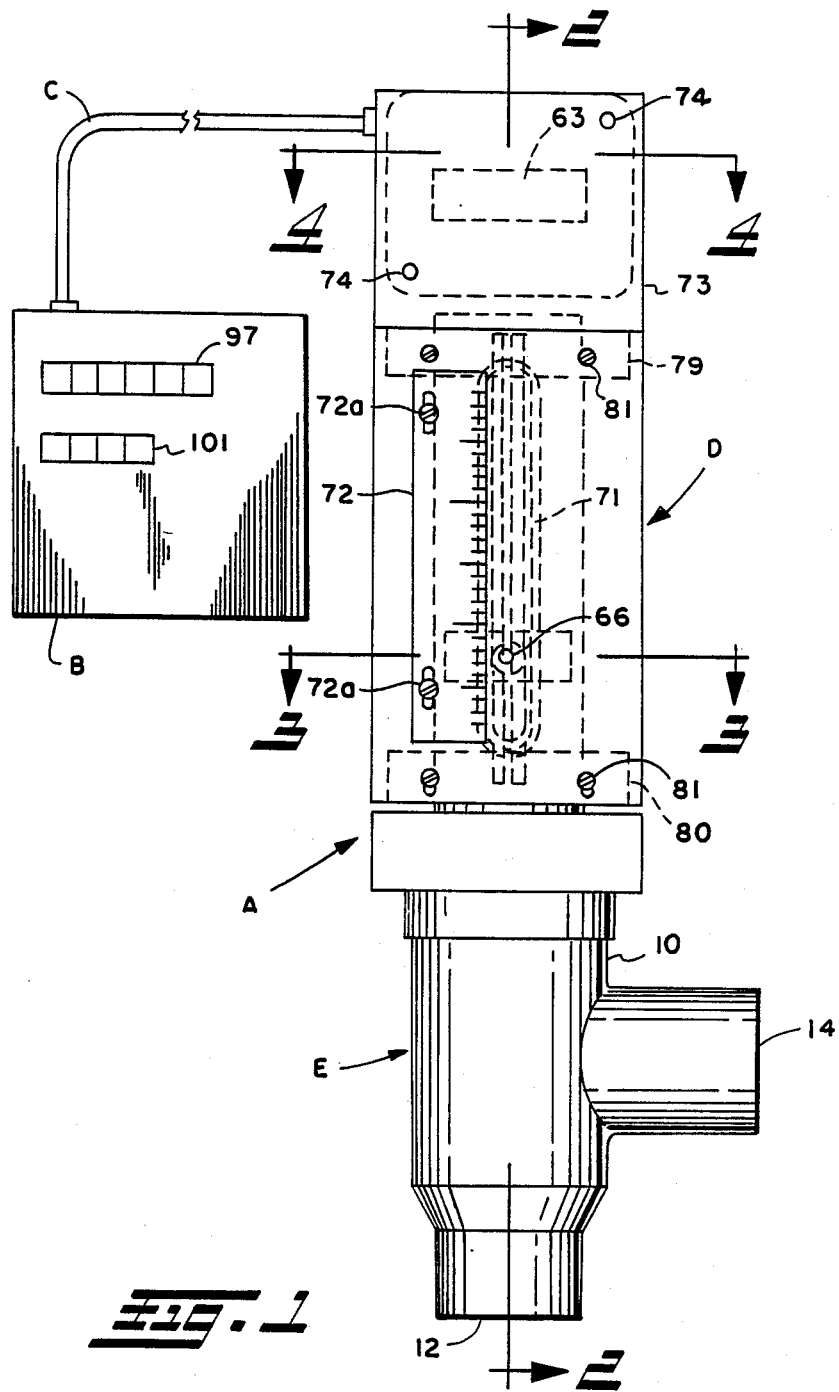
FIG. 1 is an elevation of a flow meter, transducer and remote display unit in accordance with the present invention.

Referring now to the drawings, wherein the showings are for the purposes of illustrating the preferred embodiment of the invention only and not for the purposes of limiting same, FIG. 1 shows a flow meter and transducer assembly A and an electronic display assembly B interconnected by a cable C. While the flow meter and transducer assembly A and the electronic display assembly B are shown here in close proximity, they can be separated by a great distance. The cable C can be of any reasonable desired length. Long length cables must, of course, be properly shielded.

The flow meter and transducer assembly A is comprised of a transducer assembly D and a mechanical assembly E shown assembled in FIG. 1 and disassembled in FIG. 8. Visible at the bottom of the flow meter mechanical assembly E is a body 10 having an inlet port 12 and an outlet port 14. Both the inlet port 12 and the output port 14 are conventionally internally threaded or provided with other fastening means such that the mechanical assembly E can be easily connected to fluid carrying pipes or tubing.

Figure 2:
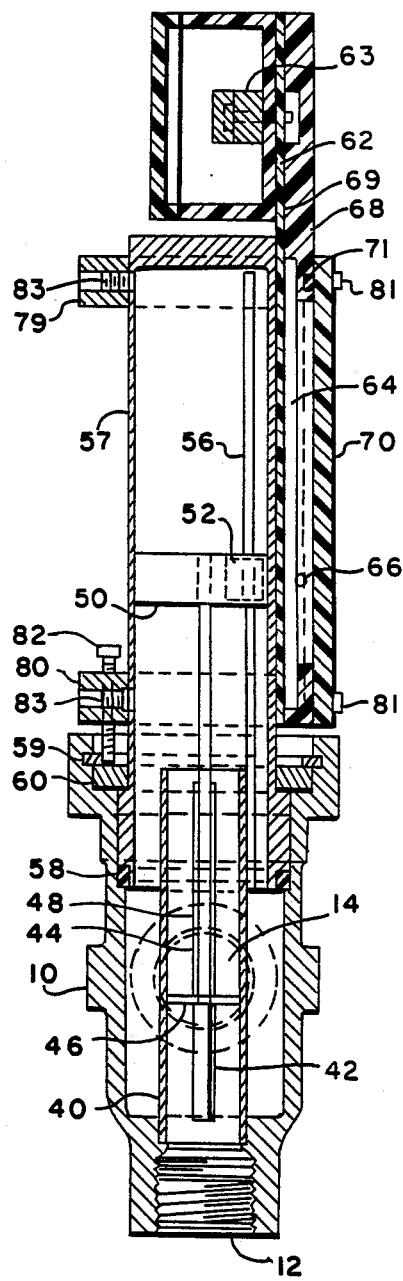
FIG. 2 is an elevational sectional view of the flow meter of FIG. 1 taken along line 2—2 of FIG. 1.

The mechanical aspects of the flow meter mechanical assembly E are best shown in FIG. 2. The inlet port 12 of the body portion 10 feeds fluid to the interior of a core tube 40. The core tube 40 has a slot 42 in its side which allows fluid to exit the interior of the core tube and flow into the outlet port 14 of the body 10.

A stem assembly 44 is disposed within the core tube 40. The stem assembly 44 is comprised of a piston 46, a connecting rod 48, and a magnet carrier 50. The piston 46 is circular in cross section and slightly smaller in diameter than the interior diameter of the core tube 40. The piston 46 rides freely vertically within the core tube 40 and by its motion adjusts the open area of the slot 42 to accommodate flow through the flow meter. As explained in U.S. Pat. Nos. 3,691,834; 4,361,051 and 4,489,614, incorporated herein by reference, the piston position is determined by flow rate and indicative of flow rate. The magnet carrier 50 is rigidly fixed with respect to the piston 46 by the connecting rod 48. Hence, the position of the magnet carrier 50 and the magnet 52 contained therein are also indicative of flow through the flow meter. Thus, the magnet carrier 50 moves up and down above flow meter body 10 in response in variations in flow through the flow meter. The magnet carrier 50 vertical position is therefore directly indicative of flow rate.

A closed cylindrical envelope 57 surrounds the path of travel of the magnet carrier 50. The envelope is fabricated from brass, 18-8 non-magnetic stainless steel, plastic, or other non-magnetic material and is closed at its top end. The bottom end of the envelope 57 is received in an opening in the top of body 10. The joint between the envelope 57 and the body 10 is sealed with an O-ring 58. The envelope 57 is held in place on the body 10 by a retaining ring 59 and a retaining spacer 60. A vertical guide rod 56 is fixed inside the envelope 57. A notch 54 in the magnet carrier 50 engages the guide rod 56 and prevents the carrier from rotating with respect to the envelope 57. This assures alignment of the magnet 52 with transducer.

The body 10 and the envelope 57 form a sealed housing for the mechanical assembly E of the flow meter. No moving parts penetrate the housing and there are no dynamic seals. A reliable fluid-tight structure is provided.

The transducer assembly D is shown assembled in FIG. 8, disassembled in FIG. 7 and in section in FIG. 2. A printed circuit board 62 is provided with a terminal block 63 which is connected to four current paths on the printed circuit board. A vertical non-magnetic stainless steel contact bar 64 is connected to one of the current paths and fixed to the printed circuit board. A resistor bar 65 is fixed to the printed circuit board 62 parallel to and in close proximity to the contact bar. The resistor bar 65 is connected at its upper end to one current path on the printed circuit board and on its lower end to another current path. Both the contact bar 64 and the resistor bar 65 are mounted on the printed circuit board 62 by means of soldering or the like. The fourth current path on the printed circuit board is a grounded strip surrounding the outside of the board and is not active in the circuit except to provide isolation.

Indicator ball 66 contacts both resistor bar 65 and contact bar 64 and electrically connects them. The indicator ball 66 is enclosed in a raceway recess 67 provided in plastic or ceramic or laminated panel which completely covers the printed circuit board 62, thereby protecting it. The raceway recess accommodates the contact bar 64, to move freely along the bars. The raceway panel is sealed to the printed circuit board by a layer of adhesive sealant 69 which is applied to the printed circuit board prior to assembly. A transparent cover 70 is fixed over the portion of the raceway panel 68 in which the raceway recess is disposed. The cover 70 is made form glass, acrylic, polycarbonate or another material as conditions require. An elastomeric sealing ring 71 in a recess in the raceway panel surrounding the raceway recess seals the joint between the raceway panel 68 and the transparent cover 70. The raceway recess 67 is thereby completely sealed and isolated from the surrounding environment.

A scale 72 is fixed to the outside of the transparent cover 70 by scale screws 72a. The scale 72 is positioned such that indicator ball 66 position can be read against it and flow through the meter discerned.

A terminal box 73 is disposed near the top of the printed circuit board 62 on the side of the board opposite the raceway panel 68. The box 73 is fixed to the printed circuit board 62 and raceway panel by screws 74 and is sealed against the printed circuit board 62 by a layer of adhesive sealant 75. The terminal box encloses the terminal block 63 and provides connections of the current paths on the printed circuit board 62 of conductors in the cable C.

A cover 76 is fixed to the terminal box 73 by means of screws 77. The joint between the cover 76 and the terminal box 73 is sealed by a gasket 78.

Figure 9:
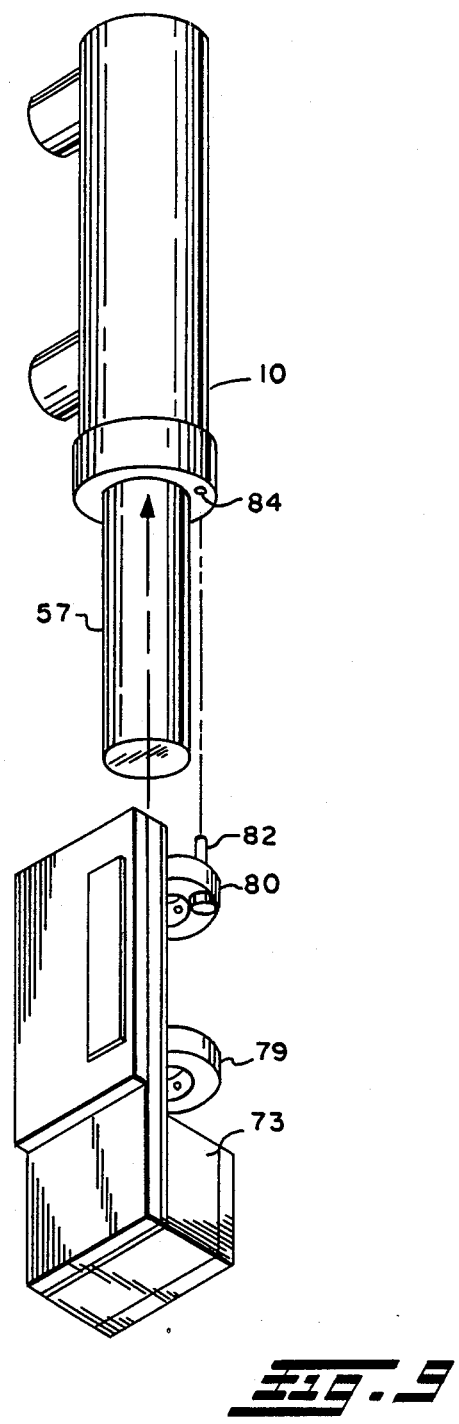
FIG. 9 is a partially exploded view showing how the preferred transducer assembly is assembled to a second type of mechanical flow meter.

An upper mounting ring 79 and a lower mounting ring 80 are fixed to the side of the printed circuit board 62 opposite the raceway panel 68 by means of transducer assembly screws 81. The screws pass through the transparent cover 70, the raceway panel 68, the printed circuit board 62 and are threaded into the mounting rings 79, 80. The two mounting rings have circular central apertures slightly larger than the outside diameter of the envelope 57. As seen in FIGS. 8 and 9, the transducer assembly is mounted on the mechanical assembly by sliding it over the envelope 57 until a positioning screw 82 encounters the body 10 of the mechanical assembly E. The positioning screw is adjusted for proper reading and two set screws 83, one in each mounting ring, are then tightened, fixing the transducer assembly in place.

FIG. 9 shows a mechanical assembly E in which the envelope 57 and magnetic carrier are disposed below the body 10. Such a structure is fully described in U.S. Pat. Nos. 4,361,051 and 4,489,614 incorporated herein by reference. The transducer assembly is fixed to such a structure by means of the set screws already described and positioned by means of a threaded aperture 84 in the body 10 of the mechanical assembly.

The heart of the transducer assembly D is a potentiometer 85 comprised of the contact bar 64, the resistor bar 65 and the indicator ball 66 best seen in FIGS. 3 and 6. The electrical connection of the potentiometer is shown in FIG. 10. One end of the resistor bar 65 is connected to a source of a reference positive voltage through the printed circuit board 62 and a reference positive voltage terminal 86. The other end of the resistor bar 65 is connected to a reference ground terminal 87. The contact bar is connected through the printed circuit board to a position signal terminal 88.

The resistor bar 65 is a tight helix of very fine wire 65a wound on a non-conducting core. The winding is sufficiently tight such that adjacent coils are spaced fifteen-ten thousanths (0.0015) of an inch, center to center. The resistance of the resistor bar, from one end to the other, is from about forty thousand ohms to about eighty thousands ohms. This high resistance makers other resistances in the circuit negligible in comparison and allows cable C to be long. In effect, the resistor bar presents a range of voltages from reference positive voltage to reference ground over its length.

The indicator ball 66 rides along the resistor bar 65 and the contact bar 64 in lock step with the magnet 52. The indicator ball 66 carries the voltage present on the resistor bar 65 at the point of contact to the contact bar 64. The voltage at the point of contact is thereby connected to the position signal terminal 88 for transmission over cable C to the electronics and display assembly B. As resistor bar 65 has over six hundred turns of wire per inch of length, the voltage level signal at terminal 88 is a very precise indication of ball position. For this signal to be an accurate representation of flow, it is necessary that the ball position must closely follow the magnet position. A number of factors interact to assure that the ball 66 accurately follows the magnet 52 in the present invention.

A high strength Neodymium Iron Boron or Samarium Cobalt rare earth magnet is used. All such magnets can be energized to a high energy product. The particular magnetic material is selected for proper temperature characteristics. The magnet is positioned in the carrier 50 near its outer edge and, thus, near the ball 66. The contact bar is fabricated from 18-8 non-magnetic stainless steel and given a very smooth 20 to 40 microinch surface finish. The indicator ball 66 is fabricated from 400 stainless steel and is given a mirror smooth surface finish. The contact bar and the indicator ball may be plated with gold, silver or other material. Importantly, the resistor bar 65 has an outside diameter of approximately 0.075 inches, the contact bar 64 has a diameter of 0.125 inches and the indicator ball 66 has a diameter of 0.1562 inches. It has been found that use of a contact bar with a larger diameter than the resistor bar improves accuracy. The use of two bars of different diameters smaller than the diameter of the indicator ball also improves accuracy. The ball 66 has been found to move along the two bars, so sized, with a minimum of resistance and a minimum of lagging. The ball 66, therefore, puts a minimum load on the magnet 52 and the stem assembly 44. The ball also closely follows the magnet providing very accurate position signals at position signal terminal 88. Importantly, hysterysis errors are minimized even when an increasing flow becomes a decreasing flow.

As described above, the ball 66 responds to movement of a magnet 52 within the flow meter by moving along the two bars thereby carrying the signal through the position signal terminal 88. This position signal is carried by cable C to a conventional bridge circuit 92. The bridge circuit 92 contains trimming poteniometers to adjust the zero reference level and the "span" or "range" of the position signal and amplifies this signal in a conventional manner. An output signal, the analog magnet position signal, is generated and applied to an analog to a digital converter 93. The analog to digital converter is conventional and creates an eleven bit position signal representative of the analog signal received as input. The digital position signal is applied to an EPROM (erasable programmable read only memory) circuit 94. The EPROM circuit 94 is factory programmed with an eight bit correction datum for each possible digital position signal. The EPROM is programmed for each model of meter produced and for special applications by testing the flow meter under the conditions in which it will be used, noting inaccuracies and building a correction curve which is programmed into the EPROM in a conventional manner. In the preferred embodiment of the invention, the EPROM is programmed by setting up to approximately 2,000 correction points to form a correction curve which precisely compensates for nonlinearities and inaccuracies in the mechanical components of the flow meter. As is conventional, the EPROM is programmed once at the factory and not reprogrammed unless a major change in metering conditions is encountered.

The output of the EPROM circuit 94, a digital correction datum, is added to the digital position signal in a digital adder 95, producing a corrected digital flow signal. The corrected digital flow signal is processed in a display driver 96 and the resulting display signals drive a digital display 97 which digitally displays the flow rate.

The corrected digital flow signal from the digital adder 95 is also applied to a totalizer 98 where it is combined with signals from a clock circuit 99. A signal representing total flow over a selected period is generated and applied to a second display driver 100 which creates display signals driving a second digital display 101. The second digital display shows total flow over a period on the face of the electronics and display assembly B.

The digital correction datum from the EPROM circuit 94 is also applied to a digital to analog converter 104 which creates an analog correction signal. The analog correction signal is added to the analog position signal from the bridge circuit 92 in an analog adder 105. The analog adder produces a variable current output having a range of four to twenty milliamperes and a variable voltage output having a range of zero to ten volts, both output signals representing flow rate. These output ranges are conventional in the process control industry.

The clock circuit 99 and a power supply 107 provide timing signals and power to the elements already described in a conventional manner.

From the above, it can be seen that a very precise mechanical flow meter provides a very precise mechanical indication of flow. Additionally, the transducer and electronic circuit provided very precisely track the mechanical indication of flow and presents an extremely precise representation of this signal at a visual display and in conventional process control signal ranges. To maintain the level of precision seen in the flow meter and in the electronic circuitry, it is necessary to provide a highly precise transducer capable of accurately describing the position of the magnet within the flow meter to the electronic circuitry. This is accomplished by the interaction of the elements described above.

The invention has been described with reference to a preferred embodiment. Obviously, modifications and alterations will occur to others upon the reading and understanding of this specification. Thus, one could use an internal battery to supply power to the transducer assembly D and replace cable C with a fiber optics cable driven by a digitizer and a diode laser within the junction box 73 for operation in environments where electrical cables are unacceptable. It is out intention to include all such modifications and alterations insofar as they come within the scope of the appended claims or the equivalents thereof.

Having thus described our invention, we claim:

1. A fluid flow meter comprising:
    a body portion having an inlet port and an outlet port;
    a core tube within said body portion having an inlet in flow communication with said inlet port and having an outlet in flow communication with said outlet port;
    a movable stem within said core tube comprising a piston, a connecting rod and a magnet holder, said piston adapted to allow flow through a variable portion of said core tube outlet dependent upon piston position, whereby piston position is dependent on fluid flow through said meter;
    a magnet contained within said magnet holder;
    an envelope fixed to said body portion enclosing said magnet holder;
    a raceway fixed to said envelope and isolated from said fluid flow, said raceway comprising first and second parallel bars;
    said first parallel bar comprises a resistor having a first end and a second end, said first end connected to a first source of reference voltage, said second end connected to a second source of reference voltage;
    said second parallel bar being connected to a signal output line;
    contact means movable in said raceway, said contact means adapted to be attracted to said magnet and being electrically conductive whereby said raceway and contact means function as a voltage divider potentiometer having an output on said signal output line indicative of contact means position;
    a signal carrying means accepting said signal and conveying it to a display means, said display means accepting said signal from said signal carrying means and creating a visually perceptible representation based upon said signal.

2. The meter of claim 1 wherein said contact means is a ball and said first and second parallel bars have generally circular cross section.

3. The meter of claim 1 wherein said contact means is visible from the exterior of said meter and a scale is provided adjacent the range of positions of said contact means whereby flow rate may be visually perceived.

4. A transducer for a fluid flow meter having a stem moving vertically in response to changes in flow, said stem having a magnet rigidly attached thereto, said transducer comprising:
    a first bar of generally uniform cross section having an axis parallel to the direction of movement of said magnet, said first bar being an electrically conductive polished cylindrical rod of non-magnetic metal;
    a second bar of generally uniform cross section having a first end, a second end and an axis parallel to the axis of said first bar, said second bar being non-magnetic and comprising a tight helical winding of fine electrically resistive wire disposed on a non-magnetic core;
    an electrically conductive, magnetically attractable metallic spherical contact means movably engaging said first bar and said second bar whereby said first bar and said second bar are in electrical contact with one another through said contact means;

power supply means providing a first reference voltage to said second bar first end and a second reference voltage different from said first reference voltage to said second bar second end; and signal carrying means electrically connected to said first bar and obtaining a signal therefrom indicative of contact means position.

5. A fluid flow meter comprising:

a body portion having an inlet port, an outlet port and a chamber connecting the inlet port to the outlet port;

a movable stem within said chamber, said stem adapted to change position in response to changes in flow through said chamber such that the position of said stem is indicative of flow rate;

a magnet fixed to said stem; and a transducer outside of said chamber comprising a resistor bar having first and second ends, a contact bar and indicator means, said resistor bar being connected to a source of reference voltage at said first end and a source of reference ground at said second end, said contact bar being connected to a position signal line, and said indicator means adapted to be attracted to said magnet and making electrical contact between said resistor bar and said contact bar at a point adjacent said magnet thereby creating a position signal on said position signal line.

6. The meter of claim 5 wherein said indicator is a steel ball having a ball diameter and adapted to be attracted by said magnet.

7. A fluid flow meter comprising:

a body portion having an inlet port, an outlet port and a chamber connecting the inlet port to the outlet port;

a movable stem within said chamber, said stem adapted to change position in response to changes in flow through said chamber such that the position of said stem is indicative of flow rate;

a magnet fixed to said stem; and, a transducer comprising a resistor bar having a circular cross section, a first diameter and first and second ends, a contact bar having a circular diameter and a second diameter different from said first diameter, and steel ball indicator means having a ball diameter and adapted to be attracted by said magnet, said resistor bar being connected to a source of reference voltage at said first end and a source of reference ground at said second end, said contact bar being connected to a position signal line, and said indicator means adapted to be attracted to said magnet and making electrical contact between said magnet thereby creating a position signal on said position signal line;

an analog to digital converter adapted to receive said position signal and create a digital position signal dependent on said position signal;

a memory means containing correction data, said memory means adapted to output one correction datum corresponding to said digital position signal;

a digital to analog converter adapted to receive said correction datum and create an analog correction signal based on said correction datum; and, an analog adder means adapted to add said analog correction signal and said position signal and create a corrected position signal based thereon.

8. The meter of claim 7 wherein said signal processing unit additionally comprises:

a digital adder means adapted to add said digital position signal and said correction datum and create a digital corrected flow rate signal; and a display driver and digital display adapted to display a digital representation of said digital corrected flow rate signal.

9. The meter of claim 8 wherein said signal processing unit additionally comprises:

a totalizer means adapted to receive said digital corrected flow rate signal and a clock signal and generate a total flow signal based thereon; and, a display driver and digital display adapted to display a digital representation of said total flow signal.

10. The meter of claim 9 wherein said indicator means is visible from the exterior of said meter and a scale is fixed to said meter adjacent the range of positions of said indicator whereby flow rate may be perceived by comparing the position of said indicator to said scale.

11. A fluid flow meter comprising:

a body portion having an inlet port and an outlet port;

a core tube within said body portion having an inlet in flow communication with said inlet port and having an outlet in flow communication with said outlet port;

a movable stem within said core tube comprising a piston, a connecting rod and a magnet holder, said piston adapted to allow flow through a variable portion of said core tube outlet dependent piston position, whereby piston position is dependent on fluid flow through said meter;

a magnet contained within said magnet holder;

an envelope fixed to said body portion enclosing said magnet holder;

a raceway fixed to said envelope, said raceway comprising first and second parallel bars;

said raceway first parallel bar having a first circular cross section, a first diameter and comprises a resistor having a first end and a second end, said first end connected to a first source of reference voltage, said second end connected to a second source of reference voltage;

said second parallel bar having a second cross section and a second diameter different from said first diameter and is connected to a signal output line;

a ball contact means movable in said raceway, said contact means adapted to be attracted to said magnet and being electrically conductive whereby said raceway and contact means function as a potentiometer having an output on said signal output line indicative of contact means position;

an electrical means sensing the position of said contact means in said raceway and generating a signal indicative of said position; and a signal carrying means accepting said signal and conveying it to a display means, said display means accepting said signal from said signal carrying means and creating a visually perceptible representation based upon said signal.

12. The meter of claim 11 wherein the diameters of said first and second bars are related to one another by approximately a factor of two.

13. The meter of claim 11 wherein the diameters of said first and second bars are related to one another by a factor of five-thirds.

14. The meter of claim 13 wherein the diameter of said first bar, the diameter of said second bar and the diameter of said contact ball are related by the ratio 12 to 20 to 25.

15. The meter of claim 14 wherein said first bar comprises a rod having fine wire wound thereon in a tight helical pattern.

16. A fluid flowmeter comprising:
a body portion having an inlet port and an outlet port;
a core tube within said body portion having an inlet in flow communication with said inlet port and having an outlet in flow communication with said outlet port;
a movable stem within said core tube comprising a piston, a connecting rod and a magnet holder, said piston adapted to allow flow through a variable portion of said core tube outlet dependent piston position, whereby piston position is dependent on fluid flow through said meter;
a magnet contained within said magnet holder;
an envelope fixed to said body portion enclosing said magnet holder;
a raceway fixed to said envelope, said raceway comprising first and second parallel bars;
said first parallel bar comprises a resistor having a first end and a second end, said first end connected to a first source of reference voltage, said second end connected to a second source of reference voltage;
said second parallel bar being connected to a signal output line;
contact means movable in said raceway, said contact means adapted to be attracted to said magnet and being electrically conductive whereby said raceway and contact means functions as a potentiometer having an output on said signal output line indicative of contact means position;
said signal output line conveying a contact position signal to a signal processing unit comprising:
an analog to digital converter adapted to receive said contact position signal and create a digital position signal dependent on said contact position signal;
a memory means containing correction data, said memory means adapted to output one correction datum corresponding to said digital position signal;
a digital to analog converter adapted to receive said correction datum and create an analog correction signal based on said correction datum; and,
an analog adder means adapted to add said analog correction signal and said contact position signal and create a corrected position signal based thereon.

17. The meter of claim 16 wherein said signal processing unit additionally comprises:
a digital adder means adapted to add said digital position signal and said correction datum and create a digital corrected flow rate signed; and,
a display driver and digital display adapted to display a digital representation of said digital corrected flow rate signal.

18. A transducer for a fluid flow meter having a stem moving vertically in response to changes in flow, said stem having a magnet rigidly attached thereto, said transducer comprising:
a first bar of generally uniform circular cross section having an axis parallel to the direction of movement of said magnet and a first diameter generally constant over the length of the first bar, said first bar being electrically conductive and non-magnetic;
a second bar of generally uniform circular cross section having a first end, a second end and an axis parallel to the axis of said first bar and a second diameter generally constant over the length of said second bar, said second bar being non-magnetic and electrically resistive along its length;
said first and second bar diameters being related to one another by a factor of approximately two;
an electrically conductive, magnetically attractable contact means movably engaging said first bar and said second bar whereby said first bar and said second bar are in electrical contact with one another through said contact means;
power supply means providing a first reference voltage to said second bar first end and a second reference voltage different from said first reference voltage to said second bar second end; and,
signal carrying means electrically connected to said first bar and obtaining a signal therefrom indicative of contact means position.

19. A transducer for a fluid flow meter having a stem moving vertically in response to changes in flow, said stem having a magnet rigidly attached thereto, said transducer comprising:
a first bar of generally uniform circular cross section having an axis parallel to the direction of movement of said magnet and a first diameter generally constant over the length of the first bar, said first bar being electrically conductive and non-magnetic;
a second bar for generally uniform circular cross section having a first end, a second end and an axis parallel to the axis of said first bar and a second diameter generally constant over the length of said second bar, said second bar being non-magnetic and electrically resistive along its length;
said first and second bar diameters being related to one another by a factor of approximately five-thirds;
an electrically conductive, magnetically attractable contact means movably engaging said first bar and said second bar whereby said first bar and said second bar are in electrical contact with one another through said contact means;
power supply means providing a first reference voltage to said second bar first end and a second reference voltage different from said first reference voltage to said second bar second end; and,
signal carrying means electrically connected to said first bar and obtaining a signal therefrom indicative of contact means position.

20. The transducer of claim 19 wherein said contact means is a steel ball having a diameter related to the smaller of said first and second bars approximately by the ratio two to one.

21. The transducer of claim 20 wherein said ratio is approximately twenty-five to twelve.

22. The transducer of claim 21 wherein said second bar comprises a core upon which a tightly wound helix of fine wire is wound.

23. A fluid flow meter comprising:
a body portion having an inlet port, an outlet port and a chamber connecting the inlet port to the outlet port;
a movable stem within said chamber, said stem adapted to change position in response to changes in flow through said chamber such that the position of said stem is indicative of flow rate;

a magnet fixed to said stem; and, a transducer comprising a resistor bar having a circular cross section, a first diameter and first and second ends, a contact bar having a circular cross section and a second diameter different from said first diameter, and steel ball indicator means having a ball diameter and adapted to be attracted by said magnet, said resistor bar being connected to a source of reference voltage at said first end and a source of reference ground at said second end, said contact bar being connected to a position signal line, and said indicator means adapted to be attracted to said magnet and making electrical contact between said resistor bar and said contact bar at a point adjacent said magnet thereby creating a position signal on said position signal line.

24. The meter of claim 23 wherein said second diameter is related to said first diameter by approximately a factor of two.

25. The meter of claim 23 wherein said second diameter is related to said first diameter by approximately a factor of five-thirds.

26. The meter of claim 23 wherein said second diameter is approximately slightly less than twice said first diameter and said ball diameter is approximately slightly more than twice said first diameter.

27. The meter of claim 23 wherein said first diameter, said second diameter and said ball diameter are approximately related by the ratio 12 to 20 to 25.

28. The meter of claim 23 wherein said resistor bar is comprised of non-conductive core and a coil of fine wire wound on said core.

29. The meter of claim 28 wherein said coil comprises more than six hundred turns per inch.

* * * * *